United States Patent Office 3,290,324
Patented Dec. 6, 1966

3,290,324
ALLANTOIN BIOTIN COMPOSITIONS
Irwin I. Lubowe, 667 Madison Ave., New York, N.Y.
No Drawing. Filed Apr. 16, 1965, Ser. No. 448,870
3 Claims. (Cl. 260—299)

This invention relates to new compositions of matter and, more particularly, to novel compounds of allantoin and biotin and to processes for making said compounds. These compositions may be incorporated in cosmetic creams as epithelial stimulants and for cellular tissue repair. They may also be used as moisturizers and as keratoplastic and epidermal healing agents.

Allantoin is a nitrogen-containing compound having the following formula:

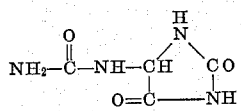

One of the compositions of the present invention comprises allantoin and biotin having the structural formula:

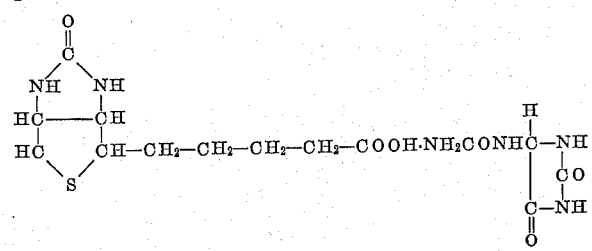

One method of forming allantoin biotin comprises thoroughly mixing 24 grams of biotin with 16 grams of allantoin. 1 to 2 cc. of boiling distilled water is immediately added to the mixture, which is thoroughly triturated until a semi-solid mass is formed. The mass is then dried at between 130° F. to 140° F. for several hours.

The resulting composition comprises:

| | Percent |
|---|---|
| Biotin | 57.1±5 |
| Allantoin | 42.9±4 |

This composition is approximately .8% soluble in cold water and is very soluble in hot water.

Another method of preparing allantoin biotin comprises dissolving 24.5 grams of biotin in 150 cc. of a 6% solution of sodium hydroxide. To this solution is added 16 grams of allantoin dissolved in 150 cc. of a 10% solution of sodium hydroxide. Both of said solutions are thorouhgly mixed together and then neutralized with concentrated hydrochloric acid accompanied by constant stirring. The final solution is cooled to 5°–10° C. overnight, after which the precipitate is filtered off and washed with ice water until free of chlorides. The precipitate is then centrifuged or subjected to vacuum in order to extract the water, after which the material is dried at 140° F. to 160° F. for 6 to 8 hours. The resulting proportions of biotin and allantoin in the composition are substantially the same as achieved with the first mentioned method.

Another composition contemplated within the present invention is the aluminum hydroxy derivative of allantoin biotin having the following structural formula:

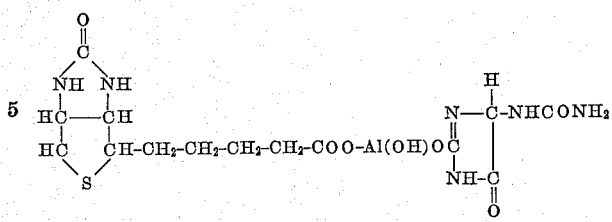

One process of forming aluminum hydroxy derivative comprises mixing thoroughly 24 grams biotin with 30 grams of aluminum dihydroxy allantoinate. To this mixture there is immediately added 1 to 2 cc. of boiling distilled water, after which the mixture is thoroughly triturated until a semi-solid mass is formed. The mass is dried at 130° F. to 140° F. for several hours.

Another composition contemplated by the present invention is the aluminum chlorhydroxy derivative of allantoin biotin, which has the following structural formula:

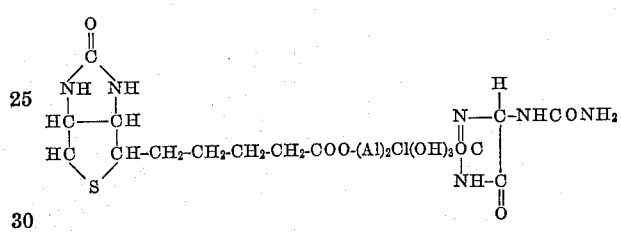

One method of preparing the aluminum chlorhydroxy derivative comprises thoroughly mixing 24 grams of biotin with 40 grams of aluminum chlorhydroxy allantoinate, to which mixture is immediately added 1 to 2 cc. of boiling, distilled water. The material is thoroughly triturated until a semi-solid mass is formed, after which the latter is dried at 130° F. to 140° F. for several hours.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. Allantoin biotin.
2. The aluminum hydroxy derivative of allantoin biotin.
3. Aluminum chlorhydroxy derivative of allantoin biotin.

References Cited by the Examiner
UNITED STATES PATENTS
3,107,252  10/1963  Lubowe _____ 260—299

OTHER REFERENCES
Lubowe and Mecca: Proc. S. S. Toilet Goods Association, No. 42 (1964), pages 6 to 8.

ALEX MAZEL, *Primary Examiner.*
HENRY R. JILES, *Examiner.*
RICHARD J. GALLAGHER, *Assistant Examiner.*